US00RE35118E

United States Patent [19]

Gerber

[11] E Patent Number: Re. 35,118

[45] Reissued Date of Patent: Dec. 12, 1995

[54] METHOD AND APPARATUS FOR FIBERIZING AND CELLULOSIC PRODUCT THEREOF

[75] Inventor: Milton Gerber, Ossian, Ind.

[73] Assignee: Advanced Fiber Technology, Inc., Cincinnati, Ohio

[21] Appl. No.: 872,965

[22] Filed: Apr. 23, 1992

Related U.S. Patent Documents

Reissue of:

[64] Patent No.: 4,919,340
Issued: Apr. 24, 1990
Appl. No.: 311,211
Filed: Feb. 15, 1989

[51] Int. Cl.[6] ..... B07C 23/34

[52] U.S. Cl. ..... 241/5; 241/24; 241/48; 241/51; 241/74; 241/86.1

[58] Field of Search ..... 241/74, 152.1, 241/189.1, 79.1, 275, 28, 18, 5, 50, 51, 57, 48, 19, 86.1, 89.3, 24

[56] References Cited

U.S. PATENT DOCUMENTS

| | | | |
|---|---|---|---|
| 335,827 | 2/1886 | Mead . | |
| 1,749,954 | 3/1930 | Luebbers . | |
| 1,758,702 | 5/1930 | Jacobson | 241/51 |
| 1,777,905 | 10/1930 | Van Gelder . | |
| 1,934,180 | 11/1933 | Fischer et al. . | |
| 2,045,582 | 6/1936 | Clement . | |
| 2,082,419 | 6/1937 | Rietz . | |
| 2,098,480 | 11/1937 | Ammon . | |
| 2,474,314 | 6/1949 | Koehne . | |
| 2,494,107 | 1/1950 | Ryan . | |
| 2,505,023 | 4/1950 | Wiliamson . | |
| 2,517,990 | 8/1950 | Dressel . | |
| 3,055,597 | 4/1962 | Mund . | |
| 3,143,303 | 8/1964 | Palyi . | |
| 3,255,793 | 8/1966 | Clute . | |
| 3,289,952 | 12/1966 | Merges et al. . | |
| 3,429,349 | 2/1969 | Ronning . | |
| 3,986,676 | 10/1976 | Husmann . | |
| 3,987,968 | 10/1976 | Moore et al. . | |
| 4,733,826 | 3/1988 | Komori et al. . | |
| 5,085,376 | 2/1992 | Litchenburg . | |
| 5,092,527 | 3/1992 | Perry et al. . | |

FOREIGN PATENT DOCUMENTS

| | | |
|---|---|---|
| 1187461 | 2/1965 | Germany . |

*Primary Examiner*—Douglas D. Watts
*Attorney, Agent, or Firm*—Harness, Dickey & Pierce

[57] ABSTRACT

A method and apparatus for fiberizing feed stock in the form of shreds or the like to form a low density cellulosic product. The shredded feed stock is fed to a material handling rotor that functions as a centrifugal blower. The apparatus includes a housing that defines a cylindrical rotor chamber formed about a horizontal axis and a volute-shaped internal passage having at least one convolution formed around the rotor chamber. Located within the housing is a cylindrical screen with perforations that open into the rotor chamber. The centrifugal blower rotor is mounted in the rotor chamber and has a plurality of radial vanes with rakes attached to the outer ends closely spaced from the inner surface of the screen so that they continuously wipe pass the perforations to prevent clogging or blinding.

58 Claims, 7 Drawing Sheets

METHOD AND APPARATUS FOR FIBERIZING AND CELLULOSIC PRODUCT THEREOF

Matter enclosed in heavy brackets [ ] appears in the original patent but forms no part of this reissue specification; matter printed in italics indicates the additions made by reissue.

BACKGROUND OF THE INVENTION

This invention relates to the production of low density, cellulosic products such as fibrous thermal insulation, and especially to an improved method and apparatus for producing such products. More particularly, the invention relates to a novel method and apparatus that utilize the energy generated by producing a high velocity flow of air with shreds of feedstock entrained therein, combined with mechanical action to fiberize the material with minimal damage to the fibers themselves.

Typically, dry process comminuting the organic materials for use as thermal insulation, absorbent pads, filters, and the like is achieved by using conventional hammer mills.

Hammer mills for performing the comminuting operation are shown in the following U.S. Pat. Nos.:

| | |
|---|---|
| 1,777,905 | 2,494,107 |
| 1,934,180 | 2,505,023 |
| 2,045,582 | 3,143,303 |
| 2,082,419 | 3,429,349. |
| 2,098,480 | |

It has been found that the use of hammer mills cannot produce a fiberized mass that will optimize the physical properties of low mass densities, high thermal resistance to heat flow, high moisture absorbence, and an acceptable aesthetic appearance.

For example, cellulose thermal insulation produced in conventional hammer mills results in products containing less than 50 percent of the mass at optimum fiber size needed to provide a low weight per cubic foot and high resistance to heat flow (R value). Typically, these products contain large (0.250 to 0.500 inch diameter) pieces of unfibered material and a large percentage of fines or dust.

In a given volume of such insulation, the following particle sizes may be observed.

| | |
|---|---|
| Coarse pieces | 20 to 40% |
| Optimum fiber size | less than 50% |
| Fines or dust | 10 to 30% |

Hammer mill design, as is apparent from the above-listed patents, utilizes hammers or beaters that are pivotally mounted on a series of disks that rotate within a partial cylindrical sizing screen. The feedstock is typically fed into the mill via an airstream flowing perpendicular to the rotating hammers. The entire mass of feedstock is then drawn down into a wedge-shaped space and onto the beginning of the sizing screen comprising a major pinch point and then forced through and over a typical semicylindrical screen.

Due to the extraordinary pressure exerted on the screen at the entry pinch point, heavy guage 3/16 to 1/4 inch thick, perforated metal screens are needed to prevent breakage from fatigue. The heavy guage further limits the perforated open area to 30 to 40% and restricts the possible use of smaller perforations.

As a result of the input feed method, the swing hammers will retract as the feedstock is worked through the screen, thereby reducing the air flow due to a relatively thick mat of material, blinding the screen, and increasing the feed residence time within the machine, resulting in fines and dust. This deficiency is often mitigated by using screens with larger perforations. This results in large unfibered pieces remaining in the product.

Another deficiency is that the hammers are supported between disks, which, in turn, prevent complete utilization of the comminuting screen surface, adding to the blinding of the perforations. As most of the systems are set up to be air-swept, blinding of perforations can have a major negative effect by retarding air flow and increasing energy consumption and product degradation.

Other types of comminuting or disintegrating apparatus have been developed for producing fibrous, cellulosic product, such as thermal insulation, and typical units are disclosed in the following U.S. Pat. Nos.:

| | |
|---|---|
| 1,749,954 | 3,986,676 |
| 3,255,793 | 3,987,968 |

While these devices are capable of producing product without the pulverizing effect caused by hammer mills, they do not reduce many of the disadvantages outlined above.

The method and apparatus of the present invention, however, resolve many of the problems listed above and provide other features and advantages heretofore not obtainable.

SUMMARY OF THE INVENTION

It is among the objects of the present invention to provide a dry process fiberization method and apparatus for producing a fiberized fluffy mass containing a greatly improved and uniform particle size distribution from fibrous organic and inorganic pieces, shreds, or fragments of isotropic feedstocks.

Another object is to produce a cellulosic thermal insulation product having a substantially lower mass density and improved resistance to heat flow.

A further object is to produce a fiberized mass to be used for absorbent pads, filter media, and other commercial and industrial fiber use.

Another object is to fiberize materials that will be aesthetically more attractive to provide greater consumer appeal.

A further object is to provide a machine that is substantially more energy-efficient per unit of product output over prior art devices.

Another object is to provide an apparatus where the feedstock enters the fiberization zone through a plurality of axial and radial spaces resulting in a uniform distribution of pressurized and high velocity fiberization in a dilute phase environment.

A further object is to provide an apparatus which provides a positive and consistent fiberizing action without blinding the internal sizing screens.

Another object is to provide in such apparatus internal air/fiber separation, thereby greatly reducing the size of downstream support equipment needed due to the large volume of air utilized within the invention.

These and other objects and advantages of the invention are achieved with the unique method and apparatus of the invention whereby shredded feedstock entrained in an airstream flowing in a duct is fed to a material handling rotor that greatly increases the velocity of the flowing stream of air and utilizes the energy thus produced together with mechanical action to: (1) separate the feedstock as much as possible into individual fibers, (2) centrifugally separate the fibrous product from a large part of the flowing airstream, and then (3) deliver the resulting product for further processing.

In accordance with the apparatus of the invention, a housing is provided with spaced, parallel side walls and a curved end wall that define a cylindrical rotor chamber formed about a horizontal axis perpendicular to the side walls. The housing also defines a volute-shaped internal passage having at least one convolution formed around the rotor chamber and centered about the axis, a tangential outlet from the volute-shaped passage, and axial inlets, preferably, one in each of the side walls, to admit a mixture of feedstock and air to the central portion of the centrifugal blower chamber from opposite sides.

Two air recirculation ducts are connected between a radially inward portion of the tangential outlet and the axial inlets for recycling separated air from the outlet to the rotor chamber. Also, a feedstock supply duct is provided for delivering material to the respective axial inlets designed to provide a secondary trap for metal separation.

Mounted within the housing is a cylindrical 360- degree light-gauge screen with 50% open area and with perforations that communicate between the rotor chamber and the volute-shaped passage. A centrifugal blower rotor is mounted in the rotor chamber for rotation about the central axis, the rotor having a plurality of radial vanes extending between side plates to define therewith a plurality of radial cells. Rakers attached to the outer ends of the vanes are closely spaced from the inner surface of the screen so that they continuously wipe past the perforations to prevent clogging of blinding.

In accordance with the method of the invention, the feedstock is fed to the central portion of a cylindrical rotor chamber, preferably from opposite sides and in opposite axial directions. The centrifugal blower rotor located within the rotor chamber is driven at relatively high speed to generate a high velocity air flow and to force the feed radially outward in the rotor chamber. The rapidly flowing mixture of feedstock and air impacts against the rakers closely spaced from the cylindrical screen so that the product is subjected to the fiberization forces of fluid, particle, and mechanical velocities and surfaces.

Then, the resulting mixture of fibers and air is centrifugally separate to form a portion of the flowing air volume free of the fibers. The separated air volume is returned to the rotor chamber inlet and the remaining mixture of air and fibrous product is discharged for further processing. The recycling of a large part of the system air requirments prevents the need to convey and use larger fans, ducts, and air/fiber separation equipment, resulting in lower overall system energy consumption and capital costs.

DESCRIPTION OF THE PREFERRED EMBODIMENT

Figure 1:
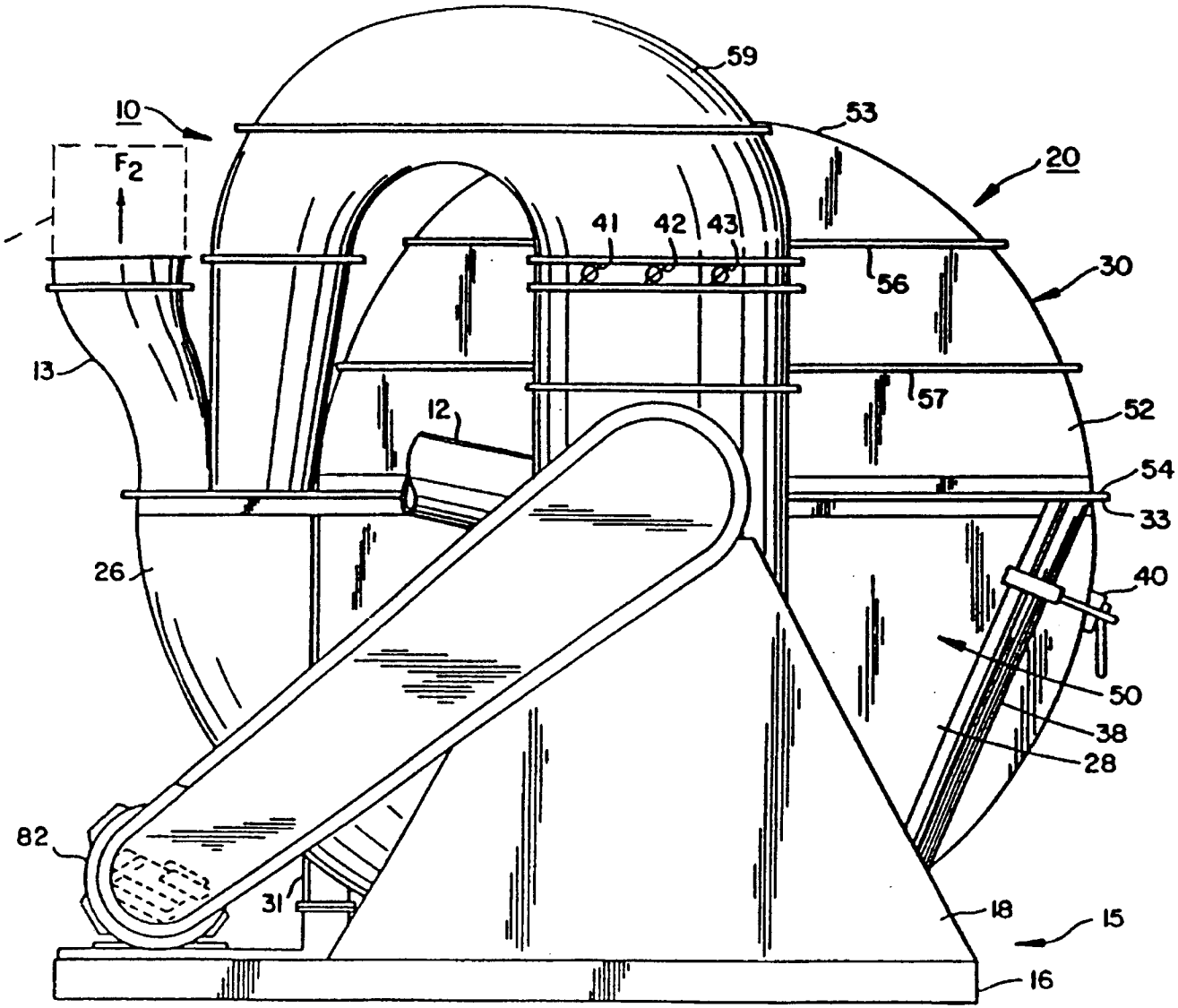
FIG. 1 is a side elevation of the fiberization apparatus embodying the invention.
Figure 2:
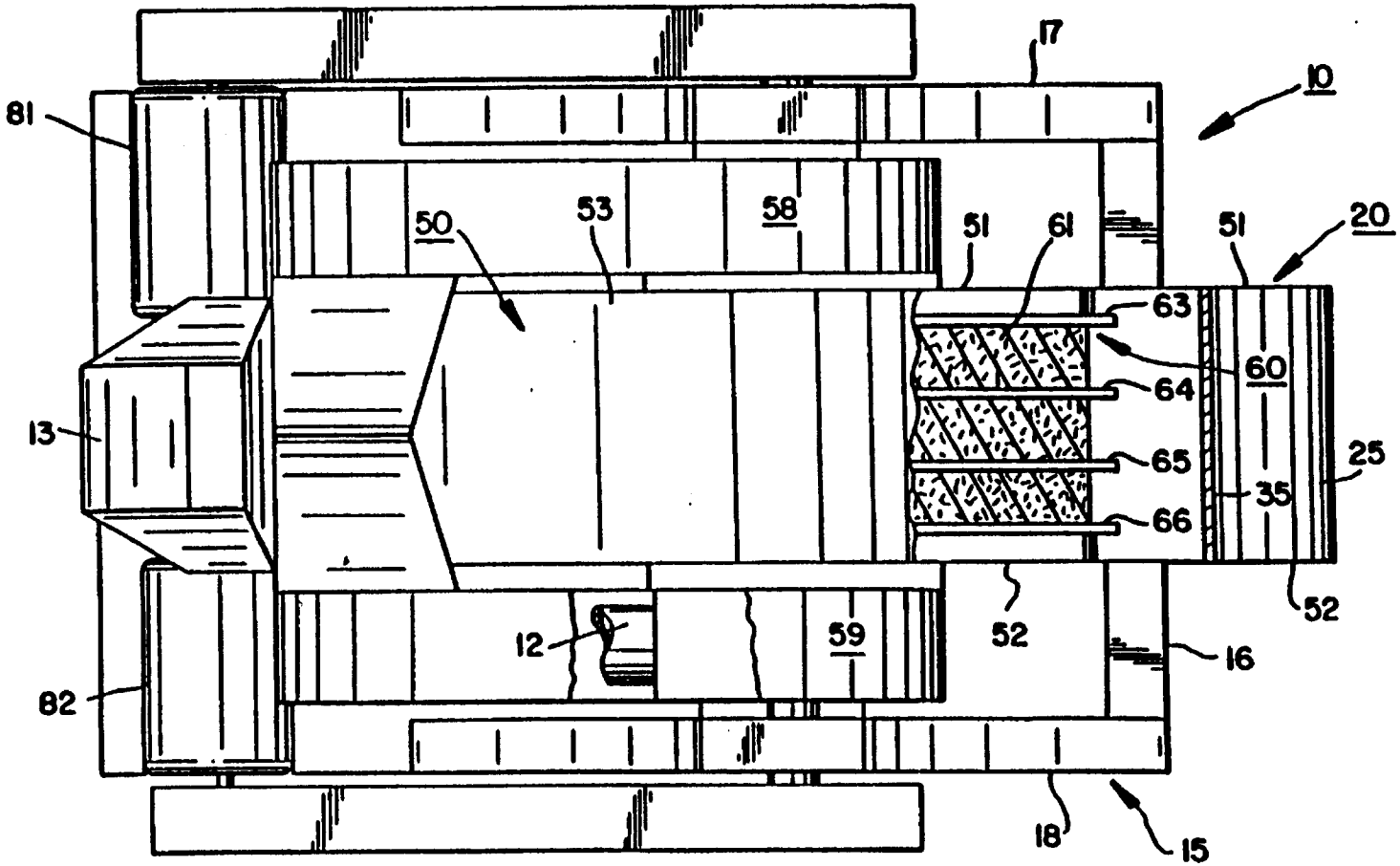
FIG. 2 is a plan view of the apparatus of FIG. 1, with parts broken away for the purpose of illustration.
Figure 3:
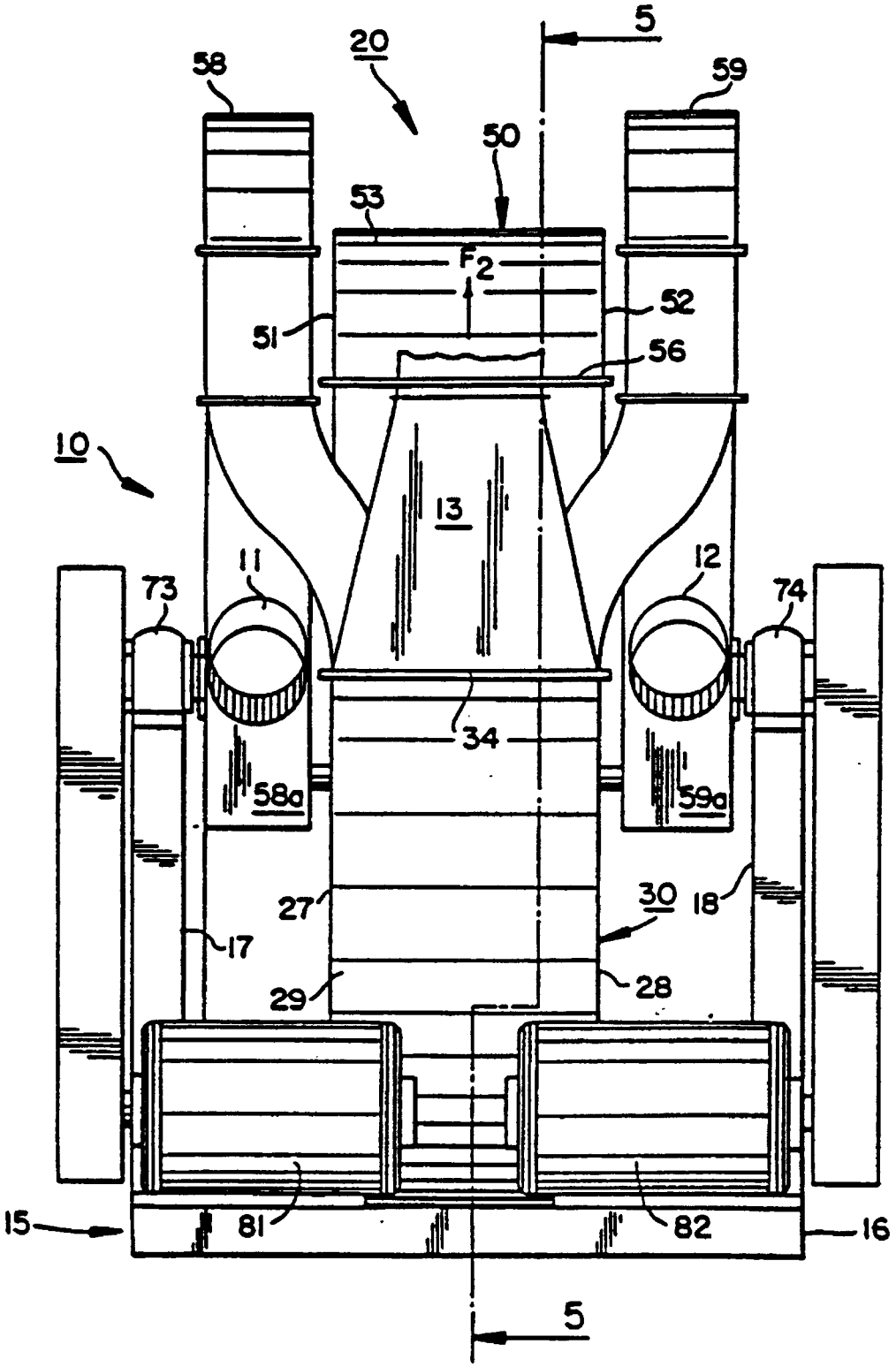
FIG. 3is an end elevation of the apparatus of FIGS. 1 and 2 taken from line 3—3 of FIG. 1.

Referring more particularly to the drawings, and initially to FIGS. 1 through 4, there is shown an apparatus 10 for fiberizing preshredded material, such as paper stock, newsprint, etc. to form a low density, fibrous, product. The apparatus is placed in an overall processing system between a pair of inlet ducts 11 and 12 for feeding material entrained in a stream of flowing air to the apparatus, and a discharge duct 13 for removing the resulting fibrous product from the apparatus.

The apparatus includes as its principal components a housing assembly 20, a cylindrical screen assembly 60 (FIGS. 4, 5, and 6) mounted within the housing assembly 20, and a rotor assembly 70 mounted within the housing and screen assembly 60.

HOUSING ASSEMBLY

The housing assembly 20 is mounted on a frame 15 formed of structural steel members and including a horizontal base 16 with upright supports 17 and 18. The housing 20 comprises a lower housing section 30 and an upper housing section 50 that are secured to one another to define a cylindrical rotor chamber 21 therewithin formed about a central axis. The chamber has a pair of central openings 23 and 24 on opposite sides thereof that receive the mixture of feedstock and air in opposite axial directions.

The sections 30 and 50 also form a volute-shaped passage 25 (FIG. 5) surrounding the cylindrical rotor chamber 21 and which is generated using the circumference of the cylindrical rotor chamber 21 as a generatrix. The volume-shaped passage 25 has at least one full convolution and in the embodiment shown has one and one-half convolutions between its initial point and a tangential outlet 26.

The lower section 30 comprises spaced, parallel, vertical side walls 27 and 28 and a curved outer wall 29 connected between the side walls. Two pairs of brackets 31 and 32 are welded to the lower portion of the curved end wall to provide a means for mounting the lower section to the base 16. One end of the lower section defines the tangential outlet 26 for the volute-shaped passage.

The section 30 defines a horizontal, upwardly facing surface with a perimetric flange 33. The tangential outlet 26 is coplanar with the top of the section, and also has a perimetric flange 34. A curved wall or partition 35 is welded within the lower section to define the volute-shaped passage.

As shown in FIG. 1, the lower section is provided with an access door 38 which pivots about a hinge 39 at the lower end thereof to provide access to the interior of the lower section 30. The door is secured, using clamps 40. Also, three pivotable valve plates 41, 42, and 43 are provided to permit the control of the recycled air flow within the passage.

The upper section 50 also has a pair of spaced, parallel, vertical, semicircular side walls 51 and 52 and a curved end wall 53.

Figure 4:
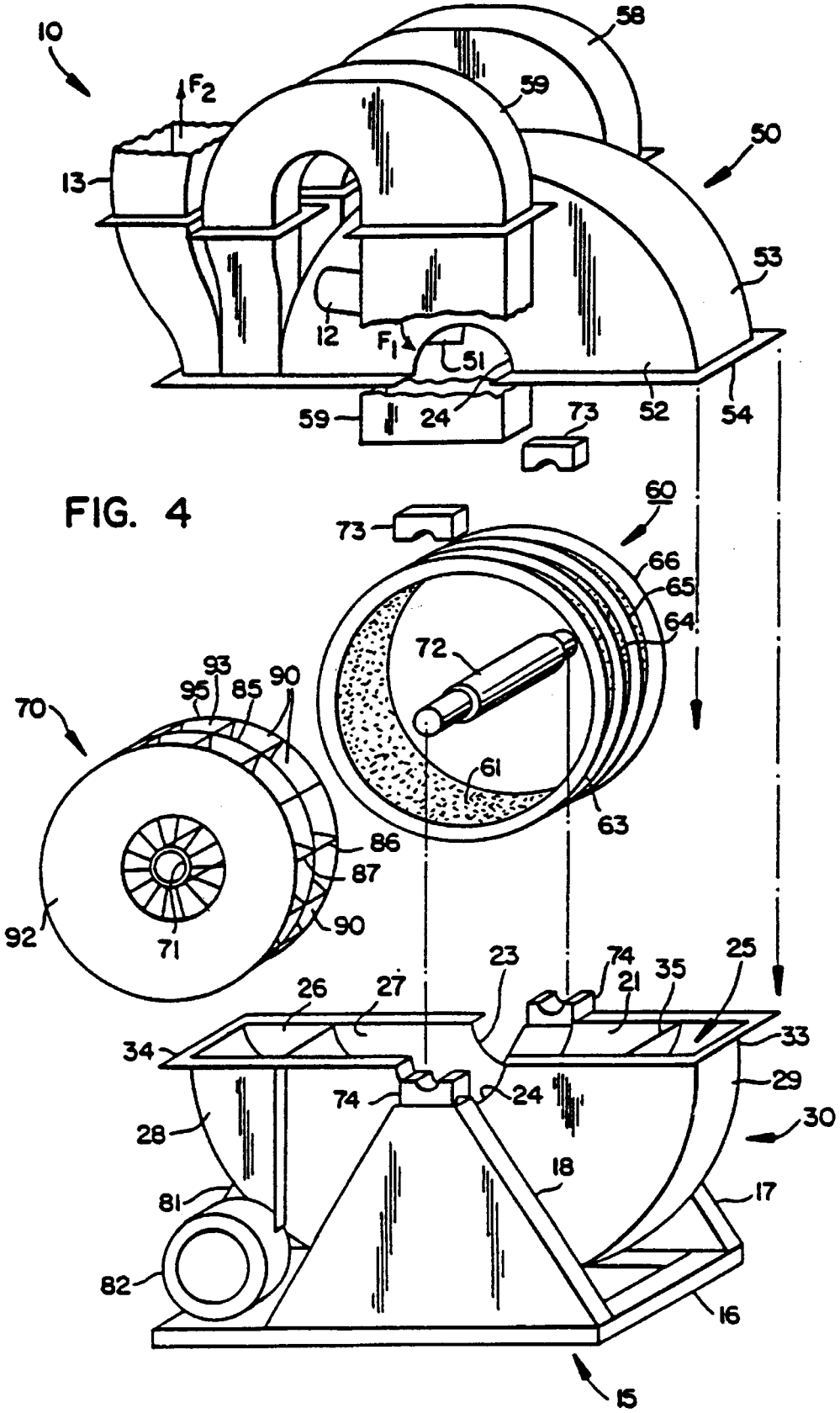
FIG. 4 is an exploded, perspective view of the apparatus of FIGS 1, 2, and 3, with parts broken away for the purpose of illustration.

As best shown in FIG. 4, the section 50 defines a horizontal lower surface with a perimetric flange 54 adapted to mate with the respective upper surface defined by the lower section 30. The flanges 33, 54 provide a means for securing the two sections together in the assembly of the housing. Also, the upper section 50 has horizontal reinforcing ribs 56 and 57 welded to the side walls, and a lower section to define the volute-shaped passage 25.

A pair of air return ducts 58 and 59 extend from the tangential outlet 26 of the volute passage 25 to the respective inlets 23 and 24 that open into the cylindrical rotor chamber 21. The end portions 58a and 59a of the ducts 58 and 59 are closed and have side openings that register with central rotor chamber openings 23 and 24, respectively. The inlet ducts 11 and 12 are secured to the return ducts 58 and 59, respectively, near the end portions 58d and 59d to open thereinto. It will be seen that the volute passage 25 directs the high velocity flow of the air volume leaving the rotor chamber in a curved path that causes centrifugal separation of fibers from a portion of the airstream. Accordingly, the air return ducts 58 and 59 are connected to a radially inward portion of the tangential outlet 26 so that the flow of air entering the ducts 58 and 59 is essentially free of fibers which have become concentrated by centrifugal force in the radially outward portion of the volute-shaped passage. The portion of the airstream carrying the fibers enters the outlet duct 13.

Preferably about 60 per cent of the air volume in the flowing stream of air is returned, the remaining 40 per cent being discharged with the fibers.

SCREEN ASSEMBLY

Figure 5:
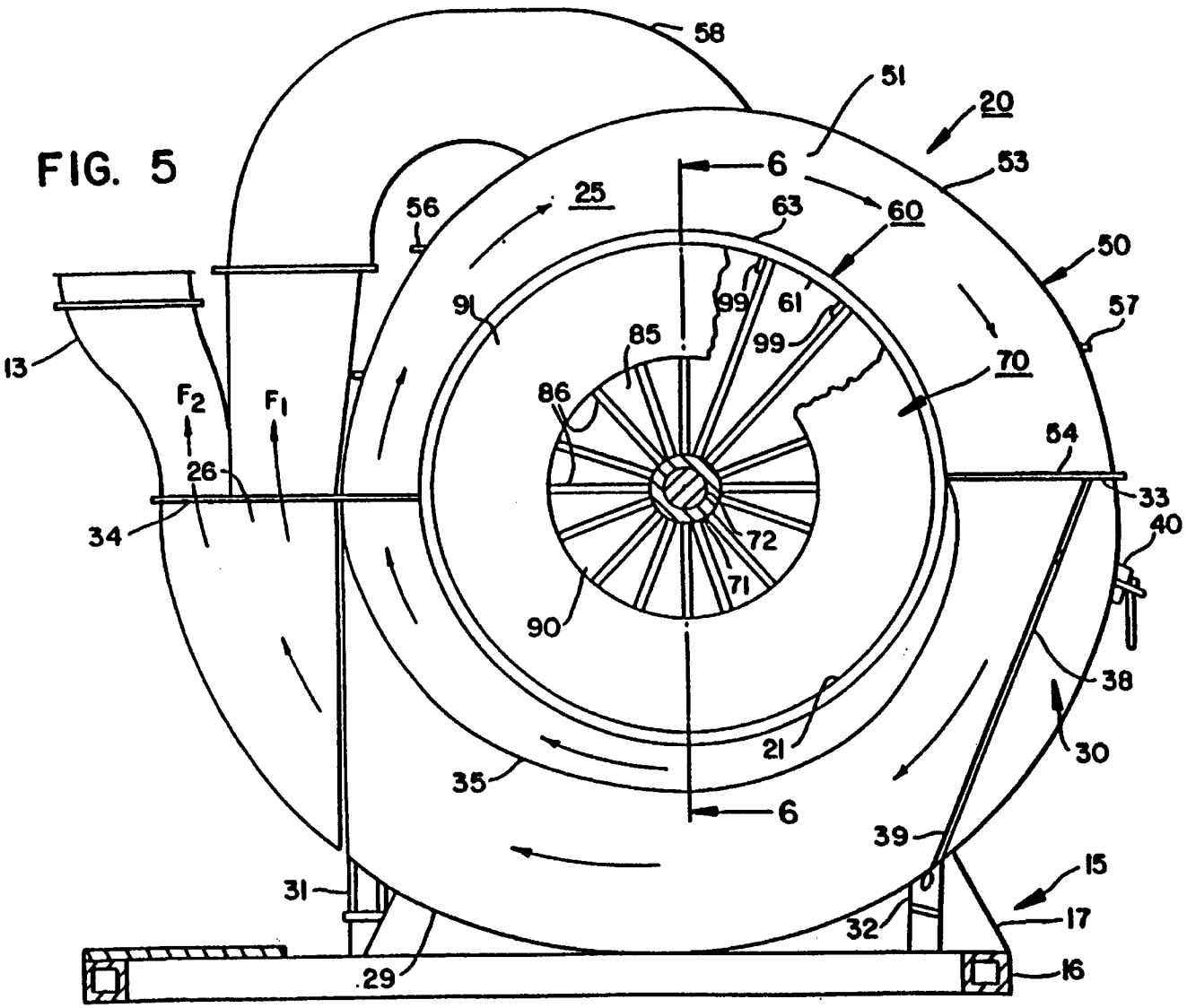
FIG. 5 is a sectional view through the apparatus taken on the line 5—5 of FIG. 3, with parts broken away for the purpose of illustration.
Figure 6:
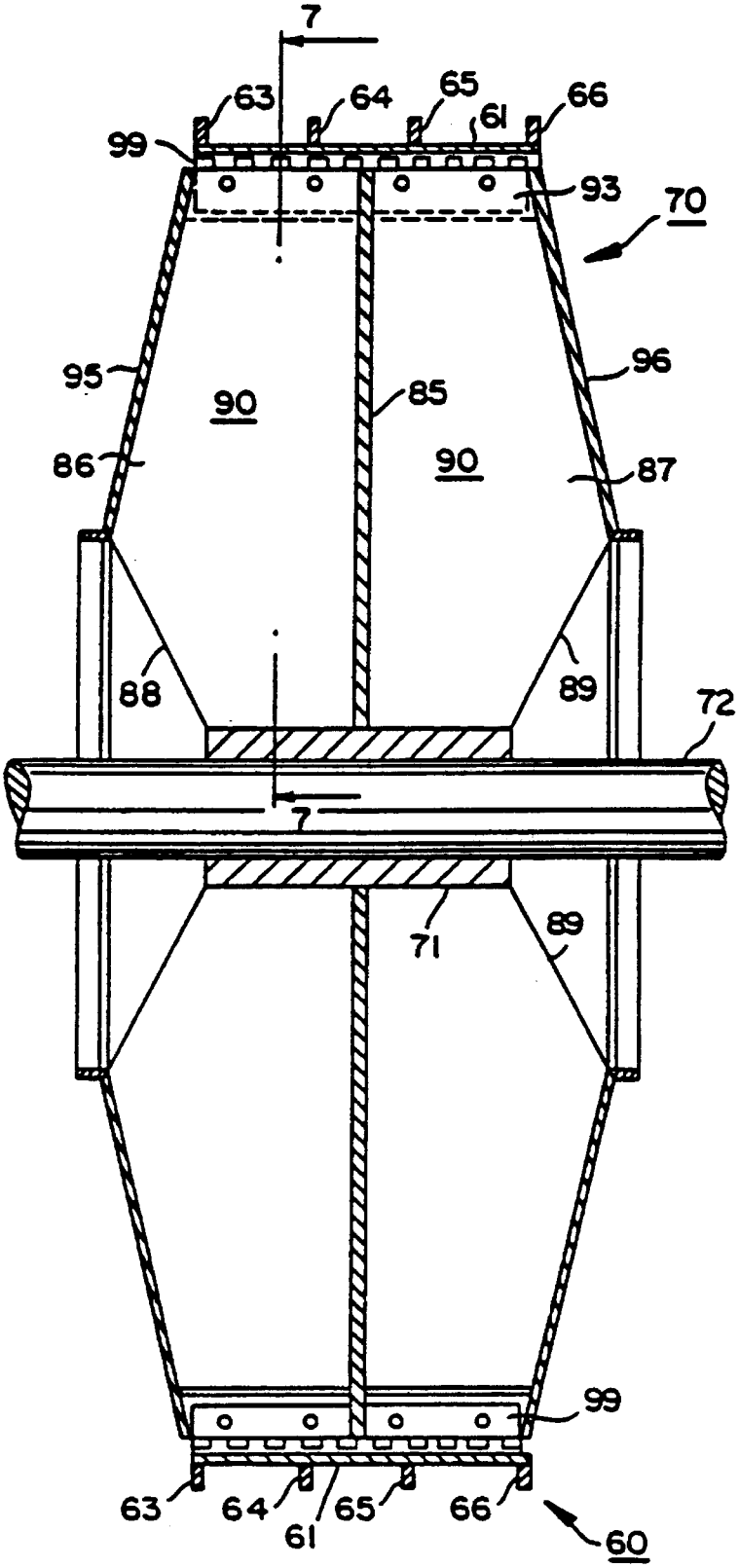
FIG. 6 is a fragmentary, sectional view of an enlarged scale, showing the construction of the centrifugal blower rotor used in the apparatus of the invention and taken on the line 6—6 of FIG. 5.

The screen assembly 60, best shown in FIGS. 4, 5, and 6, comprises a perforate length 61 of relatively flexible steel sheet formed in a cylindrical shape and supported within a frame comprising four annular ribs 63, 64, 65, and 66 equally spaced and joined by axially extending braces. The cylindrical surface defined by the interior face of the screen must be accurately dimensioned and supported, due to the close clearance between the raker bars 99 of the rotor assembly 70 and the inner surface of the screen.

The screen frame 63, 64, 65, 66 is provided with a pair of brackets used to mount the screen in the housing assembly 20. The interior surface of the screen defines a portion of the rotor chamber 21. The perforations of the screen are typically between 10/64 inch and 14/64 inch in diameter, the hole pattern in the screen being formed according to standard screen practices.

ROTOR ASSEMBLY

The rotor assembly 70 includes a cylindrical hub 71 mounted on a shaft 72 that is journaled at its opposite ends in bearing blocks 73 and 74 mounted on the tops of the respective supports 17 and 18 of the frame 15. The shaft 72 has pulleys 75 and 76 secured to its opposite ends and driven through belts 77 and 78, respectively, that are driven through pulleys mounted on the output shafts of electric drive motors 81 and 82. The motors used are typically capable of producing about 200 to 250 horsepower each. Accordingly, the maximum horsepower utilized to operate the apparatus 10 is about 400 to 500 horsepower.

A central, radial partition plate 85 is mounted on the hub 71 midway between its ends and a plurality of identical radial vane sections 86, 87 are secured on opposite sides of the partition radially coextensive therewith. The vane sections have angled, axially outer edges so that the radially inward portions 88, 89 of each vane enlarge as they extend radially outward up to a maximum width, whereafter each vane diminishes in width as it proceeds radially outwardly to the peripheral edge of each vane.

A pair of annular side walls 91, 92 are secured to the outer axial edges of the vane section 86, 87 on both sides of the rotor assembly to define with the respective vane sections and the center partition 85, radial chambers 90.

Figure 7:
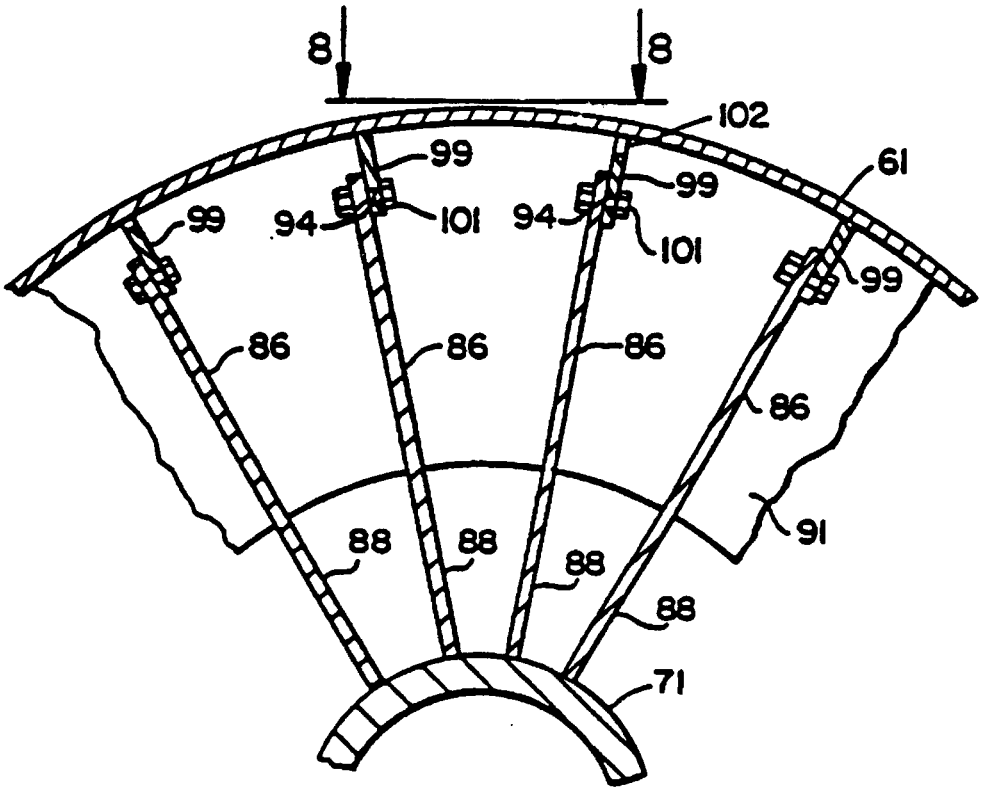
FIG. 7 is a fragmentary, sectional view of an enlarged scale, taken on the line 7—7 of FIG. 6.

Raker bars 99 are adjustably secured to the outer end portions of the vanes 86, as shown in FIGS. 5, 6, and 7, by means of threaded fasteners 101 passing through holes 94 in vanes 86 and radial slots 100 in the raker bars 99. The raker bars 99 are provided with spaced rectangular teeth 102, the tips thereof being carefully spaced from the screen 61 between minimum and maximum limits. The minimum clearance is that at which the tips are immediately adjacent to the screen 61 without touching engagement. The maximum limit is determined functionally to be that at which blinding of screen 61 and destruction of fibers do not occur. If the clearance is too great, the screen 61 will blind over, thereby inhibiting passage of air and materials therethrough Fiber destruction is observed as dust in the finished product. Typically, a clearance of 0.065 inch is satisfactory..

Figure 8:
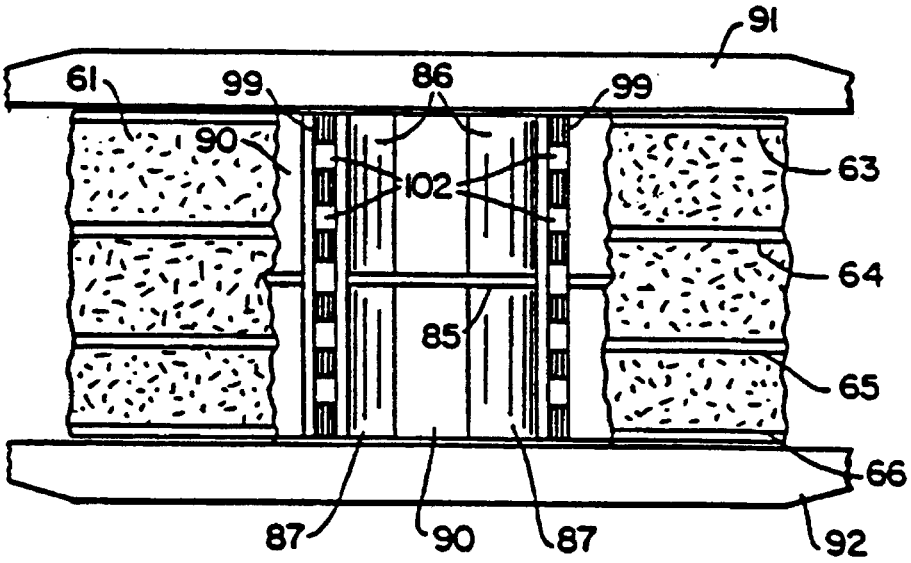
FIG. 8 is a fragmentary, sectional view, taken on the line 8—8 of FIG. 7.

The raker bars 99 extend parallel to the axis of rotor 70, with the teeth 102 of circumferentially adjacent bars 99 being staggered in an axial direction such that the spaces between teeth 102 of one bar 99 are overlapped by the teeth 102 of the circumferentially adjacent bar 99, as otherwise illustrated in FIG. 8. By this means, the entire surface of the screen 61 is swept by the bars 99 as the rotor 70 rotates.

The inner diameter of the annular side walls 95 and 96 is approximately equal to the diameter of the inlet ducts 23, 24 in the housing 20 so that, as will be apparent from FIG. 4, the flowing mixture of air with entrained feedstock enters the rotor assembly 70 from opposite axial directions in the vicinity of the radially inward portions of the radial vane sections 86, 87 and then is propelled radially outward in the radial passages 90 toward the screen assembly 60.

OPERATION

In the operation of the apparatus thus described, the feedstock to be fiberized is fed in a flowing stream of air through the inlet ducts 11 and 12 to the end portions of the air return ducts 58 and 59, where both the return air and the new mixture are introduced into the interior of the rotor chamber 21.

The rotor *50* [is] *can be* operated at relatively high peripheral speeds ranging from 15,000 to 30,000 [fpm] *f.p.m.* (*feet per minute* ), depending on the [feedstock] *feedstock* being *comminuted or* fiberized, and the pressure and velocities required, [thus generating] *and can generate* internal air and material velocities *through the screen,* ranging from [2,000] *at least 1,000* to 15,000 [fpm] *f.p.m*

The feedstock goes through no less than three rapidly changing pressure and velocity zones, thereby imparting fluid shear forces. Further, as the air/material stream, flows coutercurrently through the rakers 99 at velocities up to 15,000 fpm and collides with the oncoming rakers moving at 15,000 to 30,000 fpm, the feedstock is subjected to the dynamics of implosive forces in addition to the mechanical attrition.

When the fibers are of proper size, they are forced through the sizing screen 61 at fluid pressures and velocities two to tenfold greater than typically used in conventional hammer mill systems.

Accordingly, the combination of extremely high flow rates and continuous raking of the interior face of the screen 61 results in an extremely effective and advantageous separation of fibers without causing disintegration such as would be caused in a hammer mill operation. Also, this action produces very little dust, as compared with hammer mill-type processes.

After the fibers pass through the screen 61 with the air flow, they enter the volute-shaped passage 25 and proceed at high velocity around the passage in the direction of arrows F, subjecting them to considerable centrifugal force. The centrifugal force causes the entrained fibers to move to the radially outward zone of the passage 25 so that the portion of the flow that is radially inward becomes essentially free of fibers. About 60 per cent of the flow (denoted by the symbol $F_1$) then enters the two air return ducts 58 and 59 and is returned to the rotor chamber 21. The remaining portion of the air flow (denoted by the symbol $F_2$), which contains a more concentrated volume of the cellulosic fibers, exits through the outlet duct 13 and proceeds on for further processing.

As explained earlier, maintaining a proper clearance between the raker bars 99 and the screen 61 is essential. Additionally, rotor speed, air velocity through screen 61, and mesh size for the screen 61 must be properly selected. It is theorized that the bulk of the fiberization process is attributable to the high velocity flow of air through the screen 61 and that the raker bars serve primarily to inhibit screen blinding and to agitate continuously the material adjacent to the screen 61. By reason of the radial chambers 90 narrowing radially outwardly, a velocity increase of the air flow correspondingly occurs in the outer peripheral portions of the rotor 70. Also, a higher pressure zone occurs adjacent to the leading surface of each vane 86 providing for maximum pressure differential over the screen 61 in the regions immediately adjacent to the raker bars 99. The air flow at the raker bars 99 passes not only through the screen 61, fiberizing the material, but also between teeth 102, aiding in the material agitation process. Typically, air flow through the screen 61 ranges between four (4) and fifteen (15) cubic feet per minute per square inch of screen.

Residence time of the material within rotor 70 should be kept to a minimum, and this is assured by the high velocity air flow. Failure to maintain a sufficiently high air flow permits the feedstock to be subjected to repeated attacks by the raker bars 99, which ultimately destroys the fibers and produces dust.

It is desirable to retain the physical identity of the individual fibers in the finished product. Breaking or grinding the fibers is to be avoided, as this takes the form of undesired dust.

The apparatus and method of this invention produce a novel cellulosic product, using conventional paper feedstock as the raw material. It possesses the properties of (1) lower mass settled density, (2) higher thermal resistance to heat flow, and (3) a relatively uniform distribution of fiber size particles. It contains minimal dust and no more than minute quantities of unfibered particles. A satisfactory product produced with this invention has settled densities that range between 0.7 and 1.9 pounds per cubic foot, depending upon machine adjustment, as compared with densities of the same product produced with advanced prior art equipment that ranges from 2.1 to 2.3 pounds per cubic foot.

It has been found that the method and apparatus of the present invention result in a reduced energy demand for the production of low density fibers. The energy reduction, for example, has been found in specific applications to be between 30 per cent and 40 per cent less than that required in a hammer mill-type system.

As explained previously, it is theorized that the fiberizing action is derived primarily from the air flow through the screen 61. While the preferred form of the apparatus is as disclosed herein, it is possible to generate the air flow requirements externally rather than internally. Use of negative high pressure air source external of the [screen/raker] *screen-raker* combination, *denoted by negative high pressure external air flow generator 11 shown in FIG. 1,* along with suitable ducting, is considered to be included within the broadest scope of this invention. In this alternative form, it is not necessary to use vanes 86, but it is important that raker bars and the coaction thereof with the sizing screen be preserved.

A particular product produced with this invention ranged between 1.3 and 1.6 pounds per cubic foot settled density, depending on machine adjustments, as compared with densities of product produced with advanced prior art equipment that ranged from 2.1 to 2.3 pounds per cubic foot.

A comparison of test results obtained by Underwriters Laboratories using prior art cellulosic products and a cellulosic product obtained in accordance with the invention is shown in Table I below.

TABLE I

| Insulation Product Comparisons[1] | | |
|---|---|---|
| Property | Prior Art[2] | Invention[3] |
| Settled Density[4] | | |
| (lbs. per ft.[3]) | | |
| Mean | 2.5 | 1.5 |
| Standard | .292 | .5 |
| Deviation | 64 | 17 |
| Number of Samples | | |
| Range | 2.0–2.8 | 1.45–1.55 |
| Thermal Insulation | | |
| (R/in.) | | |
| Mean | 3.60 | 3.80 |
| Standard | .094 | — |
| Deviation | 64 | — |
| Number of Samples | | |
| Range | 3.4–3.75 | — |
| Partial Size Distribution | | |
| Coarse pieces | 20 to 40 percent | <4 percent |
| Optimum fiber size | <50 percent | >93 percent |
| Fines or dust | 10 to 30 percent | <6 percent |

[1]Products contained dry flame retardants
[2]Based on listed manufacturers in the 1988 Underwriters Laboratories Building Material Directory
[3]As tested by Underwriters Laboratories
[4]Vibrated to maximum settled density per ASTM-C739-86.

The resulting product has been capable of smoother and faster application, using standard blowing equipment for insulation cellulosic thermal installation.

While the invention has been shown and described with respect to a specific embodiment thereof, this is intended for the purpose of illustration rather than limitation, and other variations and modifications of the specific method and apparatus herein shown and described will be apparent to those skilled in the art, all within the intended spirit and scope of the invention. Accordingly, the invention is not to be limited in scope and effect to the specific embodiments herein shown and described, nor in any other way that is inconsistent with the extent to which the progress in the art has been advanced by the invention.

What is claimed is:

1. Apparatus for fiberizing organic material to form a low density fibrous product comprising:

a housing defining;

a cylindrical rotor chamber having a central axis, a volume-shaped passage formed around said rotor chamber, a tangential outlet from said volute-shaped passage, and axial inlet means for feeding said organic material into the central portion of said rotor chamber;

a discharge duct communicating with a radially outward portion of said tangential outlet for removing the fibrous product from the apparatus;

air return means communicating between a radially inward portion of said tangential outlet and said axial inlet means for recirculating a substantial portion of the air from said tangential outlet directly to said rotor chamber;

means for delivering said organic material to said axial inlet means;

a perforate cylindrical screen mounted in said housing about said axis between said rotor chamber and said volute-shaped passage;

a centrifugal blower rotor mounted in said rotor chamber for rotation about said axis and having a plurality of radial vanes with rakers mounted at the outer ends thereof, said rakers being closely spaced from the inner surface of said screen to prevent clogging of the openings in said screen; and drive means for turning said rotor at a speed sufficient to generate a flow velocity for said air and fibrous product that is received in said volute chamber, that causes centrifugal concentration of said fibrous product in the radially outward portion of said volute chamber, whereby said fibrous product is concentrated in the radially outward portion of the flow at the tangential outlet for delivery to said discharge duct and the radially inward portion of the flow that is received by said air return means at the radially inward portion of said tangential outlet is relatively free of said fibrous product.

2. Apparatus as defined in claim 1, wherein said axial inlet means comprises two axial openings located on opposite sides of said rotor chamber for feeding said organic material from opposite axial directions.

3. Apparatus as defined in claim 2, wherein said air return means comprises a pair of air return ducts extending between said radially inward portions of said

4. Apparatus as defined in claim 3, wherein said air return ducts are of sufficient size to return about 60 percent of the air flow volume from said tangential outlet to said axial inlets.

5. Apparatus as defined in claim 1, wherein said screen has openings therein that comprise about 50 percent of the surface area thereof.

6. Apparatus as defined in claim 1, wherein said openings in said screen are between 5/32 inch and 7/32 inch in diameter.

7. Apparatus as defined in claim 1, wherein said rakers are radially spaced from the inner surface of said screen about 0.065 inch.

8. Apparatus as defined in claim 1, wherein said drive means operate said rotor at peripheral speeds from 15,000 to 30,000 fpm.

9. Apparatus as defined in claim 1, wherein said rakers are provided with a plurality of laterally spaced radial teeth.

10. Apparatus as defined in claim 9, wherein said raker teeth on each vane are laterally staggered relative to the raker teeth on adjacent vanes.

11. Apparatus as defined in claim 1, wherein said rakers are radially adjustable on their respective vanes.

12. A method for fiberizing organic material to form a low density, fibrous product comprising:

feeding said organic material to the central portion of a cylindrical rotor chamber;

driving a centrifugal rotor with radial vanes at relatively high speed in said chamber to generate a high velocity air flow with said organic material entrained therein to force said organic material radially outward in said rotor chamber at relatively high velocity;

forcing said material in said air flow radially outward through perforations in a cylindrical screen surrounding said rotor to fiberize said material;

conveying said air and fiberized product exiting said screen at a relatively high flow velocity through a volute passage surrounded said screen and having a tangential outlet and thereby centrifugally separating said fiberized product from a portion of the air volume flowing through said volute chamber so that said fiberized product is concentrated in the radially outward portion of the flow at said tangential outlet;

conveying the flow from the radially outward portion of said tangential outlet through a discharge duct to a collecting means; and returning the air flow from the radially inward portion of said tangential outlet comprising a substantial portion of the air volume therein directly to said rotor chamber.

13. A method as defined in claim 12, wherein said organic material is fed into said rotor chamber through two axial openings located on opposite sides of said rotor chamber.

14. A method as defined in claim 12, wherein said separated portion of said air volume that is returned to said rotor rotor chamber comprises about 60 percent of the air flow through said screen.

15. A method as defined in claim 12, wherein said air volume flowing through said screen flows into and through a volute chamber surrounding said screen.

16. A method as defined in claim 12, wherein said rotor is operated at peripheral speeds of about 15,000 to about 30,000 fpm.

17. A method as defined in claim 12, wherein the velocity of said flow of air and feed stock generated by said rotor is from about 2000 to about 15,000 fpm.

18. A low density, fibrous product made in accordance with the method of clain 12.

19. A fibrous product as defined in claim 18 having a settled density of between about 0.7 and about 1.9 pounds per cubic foot.

20. A fibrous product as defined in claim 18, having a settled density of between about 1.3 and about 1.6 pounds per cubic foot.

21. A fibrous product as defined in claim 18, having an R value of about 3.8.

22. A fibrous product as defined in claim 18, wherein coarse pieces constitute less than 4 percent of the total volume.

*23. Apparatus for comminuting feed stock to form a low density, fibrous product comprising:*

*a housing defining:*

*a cylindrical rotor chamber having a central axis extending within a central portion of said rotor chamber,*

*a passage formed around said rotor chamber.*

*an outlet from said passage, and*

*inlet means for feeding said feed stock into the central portion of said rotor chamber;*

*means for delivering said feed stock to said inlet means entrained in a flowing fluid stream;*

*a perforate screen mounted in said housing about said axis between said rotor chamber and said passage;*

*a rotor mounted in said rotor chamber for rotation about said axis and having a plurality of radial members;*

*means associated with an outermost end portion of at least one of said radial members so as to be spaced closely adjacent said perforate screen for preventing blinding of said screen as said feed stock passes through said perforate screen;*

*drive means for turning said rotor; and*

*means for generating a fluid stream velocity of air and said feed stock of at least* 1000 f.p.m. through the perforations in said screen.

*24. Apparatus as defined in claim 23, wherein said means for generating a fluid stream velocity further includes an auxiliary flow generator.*

*25. Apparatus as defined in claim 24, wherein said auxiliary flow generator is located downstream of said outlet.*

*26. Apparatus as defined in claim 23, wherein said fluid stream velocity produced through said perforations is between 1000 and 15,000 f.p.m.*

*27. Apparatus as defined in claim 23, wherein said passage formed around said rotor is volute-shaped and wherein said outlet is tangential and located at the downstream end of said volute-shaped passage.*

*28. Apparatus as defined in claim 27, further comprising air return means communicating between a radially inward portion of said tangential outlet and said inlet means.*

*29. Apparatus as defined in claim 28, wherein said air return duct is of sufficient size to return about 60 percent of the air flow volume from said tangential outlet to said outlet.*

*30. Apparatus as defined in claim 23, wherein said screen has openings therein that comprise about 50 percent of the surface area thereof.*

*31. Apparatus as defined in claim 30, wherein said openings in said screen are between approximately* 5/32 *and* 7/32 *inch in diameter.*

*32. Apparatus as defined in claim 23, wherein said rakers are radially spaced from the inner surface of said screen about 0.065 inch.*

*33. Apparatus as defined in claim 23, wherein said drive means operates said rotor at peripheral speeds from 15,000 to 30,000 f.p.m.*

*34. Apparatus as defined in claim 23, wherein said rakers are provided with a plurality of laterally spaced radial teeth.*

*35. Apparatus as defined in claim 34, wherein said raker teeth on each vane are laterally staggered relative to the raker teeth on adjacent vanes.*

*36. Apparatus as defined in claim 23, wherein said rakers are radially adjustable on their respective radial members.*

*37. Apparatus for fiberizing organic material to form a low density fibrous product comprising;*

*a housing defining;*

*a cylindrical rotor chamber having a central axis extending within a central portion of said rotor chamber;*

*a passage formed around said rotor chamber;*

*an outlet from said passage;*

*axial inlet means for feeding said organic material into the central portion of said rotor chamber;*

*a discharge duct communicating with said outlet for removing the fibrous product from the apparatus;*

*means for delivering said organic material to said axial inlet means;*

*a perforate cylindrical screen mounted in said housing about said axis between said rotor chamber and said passage;*

*a centrifugal blower rotor mounted in said rotor chamber for rotation about said axis and having a plurality of radially extending vanes;*

*raker means disposed at an outermost end portion of at least one of said vanes for agitating said feed stock as said feed stock passes through said screen to prevent blinding of said screen, said raker means being positioned closely adjacent an inner surface of said screen; and*

*drive means for turning said rotor at a speed sufficient to generate a flow velocity for said air and fibrous product that is received in said passage, that causes centrifugal concentration of said fibrous product in the radially outward portion of said passage.*

*38. Apparatus for comminuting feed stock to form a low density fibrous product having a settled density of between about 0.7 and 1.9 pounds per cubic foot comprising:*

*a housing defining:*

*a cylindrical rotor chamber having a central axis,*

*a passage formed around said rotor chamber,*

*an outlet from said passage, and*

*inlet means for feeding said feed stock into the central portion of said rotor chamber;*

*means for delivering said feed stock to said inlet means entrained in a flowing fluid stream;*

*a perforate screen mounted in said housing about said axis between said rotor chamber and said passage;*

*a rotor mounted in said rotor chamber for rotation about said axis and having a plurality of radially extending members;*

*raker means disposed at outermost end portions of said radially extending members and positioned so as to be spaced approximately 0.065 inch from an inner surface of said screen, said rakers operating to agitate said feed stock as said feed stock approaches and passes through said screen to thereby prevent blinding of said screen;*

*drive means for turning said rotor; and*

*means including said rotor for generating a fluid stream velocity of air and said feed stock of at least 1000 f.p.m. through the perforations in said screen.*

*39. A method for fiberizing organic material to form a low density, fibrous product having a settled density of between about 0.7 and about 1.9 pounds per cubic foot comprising:*

*feeding said organic material to the central portion of a cylindrical rotor chamber;*

*driving a centrifugal rotor with radial vanes at relatively high speed in said chamber to generate a high velocity air flow with said organic material entrained therein to force said organic material radially outward in said rotor chamber at relatively high velocity;*

*forcing said organic material entrained in said air flow radially outward through perforations in a cylindrical screen surrounding said rotor to fiberize said organic material into said fibrous product;*

*conveying said air and fibrous product exiting said cylindrical screen at a relatively high flow velocity through a passage surrounding said cylindrical screen and having an outlet and thereby centrifugally separating said fibrous product from a portion of the air volume flowing through said passage so that said fibrous product is concentrated in the radially outward portion of the flow at said outlet;*

*using a raker bar disposed at an outermost end portion of at least one of said radial vanes and positioned closely adjacent an inner surface of said screen to agitate said material as said material passes closely adjacent said perforations in said cylindrical screen just prior to said material passing through said perforations, to thereby prevent blinding of said screen by said material; and*

*conveying the flow of said fiberized product from said outlet through a discharge duct to a collecting means.*

*40. A method for comminuting feed stock to form a low density product comprising:*

*feeding said feed stock to a central portion of a cylindrical rotor chamber;*

*generating a high velocity fluid flow of air with said feed stock entrained therein to force said feed stock radially outward in said rotor chamber at relatively high velocity;*

*driving a rotor having radial rakers about a central axis of said rotor chamber, said rakers being closely spaced from the inner surface of a perforate cylindrical screen mounted around said rotor;*

*forcing said resulting fluid flow radially outward through the perforations of said screen at a fluid stream velocity of at least about 1000 f.p.m. through the perforations in said screen in comminute said feed stock;* using said rakers to prevent blinding of said screen by said feed stock and to agitate said feed stock closely adjacent said screen to further facilitate comminuting said feed stock; and

*discharging the comminuted product.*

*41. A method as defined in claim 40, wherein said rotor further has radial vanes to which said rakers are attached and said high velocity fluid flow is produced by the rotation of said rotor.*

*42. A method as defined in claim 40, wherein said high velocity fluid flow is produced in part by auxiliary glow generating means separate from said rotor.*

*43. A method as defined in claim 41, wherein said auxiliary flow generating means is located downstream of the location where the comminuted product is discharged.*

*44. A method as defined in claim 40, including the additional step of centrifugally separating the comminuted product from a portion of the air volume flowing through said screen.*

*45. A method as defined in claim 44, wherein said separated portion of said air volume is returned to said rotor chamber.*

*46. A method as defined in claim 45, wherein said separated portion of said air volume comprises about 60* of the air flow through said screen.

*47. A method as defined in claim 44, wherein said air volume flowing through said screen flows into and through a volute chamber surrounding said screen.*

*48. A method as defined in claim 40, wherein said rotor is operated at peripheral speeds of about 15,000 to about 30,000 f.p.m.*

*49. A method as defined in claim 40, wherein the velocity of said fluid stream velocity is from about 1000 to about 15,000 f.p.m.*

*50. A comminuted product made in accordance with the method of claim 40.*

*51. A comminuted product as defined in claim 50 having a settled density of between about 0.7 and about 1.9 pounds per cubic foot.*

*52. A method for comminuting feed stock to form a low density product having a settled density of between about 0.7 and about 1.9 pounds per cubic foot comprising:*

*feeding said feed stock to the central portion of a cylindrical rotor chamber:*

*generating a high velocity fluid flow of air with said feed stock entrained therein to force said feed stock radially outward in said rotor chamber at relatively high velocity;*

*driving a rotor having radial rakers about the central axis of said rotor chamber, said rakers being radially spaced approximately 0.065 inch from the inner surface of a perforate cylindrical screen mounted around said rotor;*

*forcing said resulting fluid flow radially outward through the perforations of said screen at a fluid stream velocity of at least about 1000 f.p.m. through the perforations in said screen to comminute said feed stock;*

*using said rakers to prevent blinding of the openings in said screen by said product as said product passes through said openings; and*

*discharging the comminuted product to a collection means.*

*53. Apparatus as defined in claim 23, wherein said means for preventing blinding of said screen comprises a raker adjustably secured to said outermost end portion of said at least one radial member.*

*54. Apparatus as defined in claim 23, wherein said means for preventing blinding of said screen further operates to continuously agitate said feed stock when said feed stock is closely adjacent said perforate screen to thereby further help comminute said feed stock.*

*55. A low density, fibrous comminuted product having a settled density of about 0.7 to about 1.9 pounds per cubic foot formed by:*

*feeding feed stock into a cylindrical rotor chamber having a plurality of radially extending vanes rotating sufficiently rapidly to generate a fluid stream having a radially outward velocity through the screen of at least about 1000 feet per minute;*

*causing said fluid stream having said feed stock entrained therein to be passed through a screen positioned closely adjacent outermost end portions of said vanes to thereby comminute said feed stock;*

*using a plurality of raker bars disposed at said outermost end portions of said vanes to prevent blinding of said screen and to further agitate said feed stock to aid in comminuting said feed stock; and discharging said*

*comminuted feed stock representing said product from same rotor chamber.*

*56. A comminuted product as defined in claim 55 having a settled density of between about 1.3 and about 1.6 pounds per cubic foot.*

*57. A comminuted product as defined in claim 55 having an R value of about 3.8.*

*58. A comminuted product as defined in claim 55, wherein said product comprises coarse pieces and fine pieces, and wherein said coarse pieces constitute less than about 4 percent of the total volume of said product.*

* * * * *

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

On the Title Page under Attorney, Agent, or Firm,

"Harness, Dickey & Pierce" should be -- Harness, Dickey & Pierce, P.L.C. --

Column 1, line 21,
"the" should be -- of --.

Column 1, line 66,
"guage" should be -- gauge --.

Column 2, line 1,
"guage" should be -- gauge --.

Column 2, line 2,
"to" (second occurrence in patent) should be -- or --.

Column 3, line 41,
"of" should be -- or --.

Column 4, line 3,
"3is" should be -- 3 is --.

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

Column 4, line 12,
"of" should be -- on --.

Column 4, line 16,
"of" should be -- on --.

Column 5, line 46,
"in" should be -- into --.

Column 6, line 33,
"materials" should be -- material --.

Column 6, line 33,
after "therethrough" insert -- . --.

Column 6, line 35,
delete "." (second occurrence in patent).

Column 6, line 67, after "f.p.m" insert -- . --.

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

Column 7, line 4,
"coutercurrently" should be -- countercurrently --.

Column 8, lines 19 and 20,

"negative" should be -- *negative* --.

Column 9, line 62, Claim 3,
after "said" insert -- tangential outlet and said axial inlet openings. --.

Column 10, line 50, Claim 14,
delete "rotor" (second occurrence in patent).

Column 10, line 62, Claim 18,
"clain" should be -- claim --.

Column 11, line 12, Claim 23,

"." should be -- , --.

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

Column 11, lines 31, 32, Claim 23,

"1000 f.p.m. through the perforations in said screen" should be
– *1000 f.p.m. through the perforations in said screen* –.

Column 11, line 51, Claim 29,

"outlet" (second occurrence in patent) should be – inlet –.

Column 12, line 5, Claim 37,

"," should be – : –.

Column 13, line 46, Claim 40,

"in" should be – to –.

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

Column 13, lines 47, 48, 49, 50, Claim 40,
lines 16, 17, 18, Claim 40)

"using said rakers to prevent blinding of said screen by said feed stock and to agitate said feed stock closely adjacent said screen to further facilitate comminuting said feed stock; and" should be -- *using said rakers to prevent blinding of said screen by said feed stock and to agitate said feed stock closely adjacent said screen to further facilitate comminuting said feed stock; and* --.

Column 13, line 57, Claim 42,

"glow" should be -- flow --.

Column 14, lines 3, 4, Claim 46,

"60 of the air flow through said screen should be --60% of the air flow *through said screen* --.

Column 14, line 67, Claim 55, begin new paragraph with *"discharge"*.

UNITED STATES PATENT AND TRADEMARK OFFICE

CERTIFICATE OF CORRECTION

PATENT NO. : RE. 35,118

DATED : December 12, 1995

INVENTOR(S) : Milton Gerber

It is certified that error appears in the above-identified patent and that said Letters Patent is hereby corrected as shown below:

Column 15, line 2, Claim 55,

"same" should be – said –.

Signed and Sealed this

Ninth Day of July, 1996

*Attest:*

*Attesting Officer*

BRUCE LEHMAN

*Commissioner of Patents and Trademarks*